United States Patent [19]
Reed

[11] 3,919,684
[45] Nov. 11, 1975

[54] UNDERWATER SEISMIC SOURCE AND METHOD

[75] Inventor: Dale H. Reed, Dallas, Tex.

[73] Assignee: Atlantic Richfield Company, Los Angeles, Calif.

[22] Filed: Jan. 4, 1974

[21] Appl. No.: 430,641

[52] U.S. Cl................. 340/8 R; 181/118; 340/12 R
[51] Int. Cl.².......................................... H04B 13/00
[58] Field of Search .............. 340/8, 8 C, 9, 10, 12, 340/13, 17; 181/116–120

[56] References Cited
UNITED STATES PATENTS

| | | |
|---|---|---|
| 3,018,467 | 1/1962 | Harris ............................ 340/14 X |
| 3,538,494 | 11/1970 | Erickson ......................... 340/12 R |
| 3,545,563 | 12/1970 | Cholet ............................. 181/118 |
| 3,564,492 | 2/1971 | Magneville et al................ 340/12 R |
| 3,670,840 | 6/1972 | Gundlach........................... 181/117 |
| 3,741,333 | 6/1973 | Muniz et al....................... 340/17 |

Primary Examiner—Harvey E. Behrend
Assistant Examiner—Harold Tudor
Attorney, Agent, or Firm—Robert M. Betz

[57] ABSTRACT

A torpedo-shaped underwater seismic gun adapted to deliver an acoustic pulse to a submarine earth surface consists of an aft main body section and a separable forward nose section supported beneath a float in a submerged position in any desired offshore location. An axial connecting rod joins the nose section to a piston slidable within a sealed cylindrical bore extending partially along the main body section, both sections being free of external constraints on relative longitudinal movement thereof other than the resistance of the water. An air spring in the cylindrical bore behind the piston urges the main body section and the nose section together to form an interface between respective transverse external surfaces thereof. Ignition of an explosive gas mixture in front of the piston in the cylindrical bore drives the piston and the main body section in opposite directions to separate these two sections rapidly, thereby creating a low pressure bubble of condensable water vapor between the two external surfaces. Implosion of this bubble responsive to hydrostatic pressure generates a singular seismic pulse having a peak pressure on the order of $10^4$ atmospheres.

2 Claims, 3 Drawing Figures

UNDERWATER SEISMIC SOURCE AND METHOD

BACKGROUND OF THE INVENTION

1. Field of the Invention

This invention is generally related to the field of marine seismic exploration devices and more particularly to a method and apparatus for transmitting a seismic pulse to a submarine earth surface which utilizes the force generated by an imploding high vacuum vapor bubble within the water.

2. Description of the Prior Art

The art of underwater seismic sources for offshore exploration includes gun-type devices supported beneath a floating vessel in which an impact mass is driven downwardly with explosive force to transmit a positive acoustic pulse through the water to a submarine earth surface. Typically, however, the mass is subjected to upwardly directed reactive forces which cause it to reverse direction rapidly. The result is that a so-called cavitation bubble is produced adjacent exposed surfaces of this mass. The collapse or implosion of the bubble against these surfaces responsive to hydrostatic pressure generates a secondary positive pulse of energy. In addition to its undesirable degradation of these exposed surfaces, this pulse, frequently having higher peak pressure than the original pulse, complicates the character of the overall pressure spectrum and the reflections sought to be obtained with equipment of this type. Thus, it has been an objective of prior art underwater seismic devices of this nature to incorporate means for protecting exposed surfaces against these cavitation effects and, where possible, to inhibit the growth of the bubbles.

It has seemed profitable to explore the possibility of making direct use of the energy of an imploding vapor bubble within a body of water and use it as a primary seismic energy source.

Seismic devices are known which produce bubbles of incondensable gas or vapor. The implosion of such bubbles is characterized by a so-called "pneumatic rebound" as the vapor pressure within the bubble increases; and, as a consequence, a chain of bubble oscillations of decreasing magnitude takes place. This phenomenon is difficult to control and is undesirable if a clean pressure spectrum is to be achieved.

In at least one prior art device or system, steam is ejected under pressure into the water at a certain depth. It is surmised that a high pressure vapor bubble is created which subsequently collapses after the steam cools and condenses; and that upon complete collapse of the bubble, a high acoustic pressure pulse is radiated. The advantage of this system over one in which a bubble of incondensable vapor is generated is that the oscillatory bubble effect of the former is avoided by the permanent phase change which accompanies the implosion. However, the steam injection which forms the bubble will result in an undesirable positive precursor pulse of substantial magnitude.

Yet another prior art system proposes to use an air gun as a device for accelerating a piston within a cylinder open to the water in front of the piston so that its forward motion ejects water into the surrounding sea water. The motion of the ejected "plug" of water causes a cavitation which implodes to release acoustical energy. In this case, the water itself is being employed as the displacement means; and as in the case of the steam gun, the system requires extensive auxiliary equipment such as boilers and air compressors.

SUMMARY OF THE INVENTION

It is, therefore, a general object of this invention to provide an improved underwater seismic source and method for offshore exploration which directly utilizes hydrostatic pressure to generate a seismic pulse.

It is a further object of this invention to provide a seismic source and method of the character described which produces a singular pressure pulse free of secondary disturbances.

It is yet another object of this invention to provide a seismic source and method of the character described which generates a pressure spectrum which is highly repeatable.

It is a still further object of this invention to provide a seismic source and method of the character described which achieves a highly efficient conversion of chemical into mechanical energy in the generation of a seismic pulse.

Other objects and advantages of this invention will become apparent from a consideration of the detailed description to follow taken in conjunction with the drawings appended thereto.

In accordance with a preferred embodiment of this invention, a tubular hydrodynamically streamlined seismic gun, positioned beneath the surface of the water, consists of an aft main body section axially aligned and interfitted in end-to-end relation with a separable forward nose section. A piston attached to the extremity of a rod extending axially from the rear of the nose section is slidable within a sealed cylindrical bore in the main body section. Relative longitudinal movement of the two sections is not subject to external constraint other than minimal water resistance. An air spring behind the piston urges it in one direction to draw the nose section against the main body section so that an interface is established between respective external transverse surfaces thereof. An explosive gas mixture is thereafter ignited within the cylindrical bore in front of the piston so as to drive the piston and the main body section in opposite directions to separate the two transverse surfaces by a predetermined distance. In this manner, a low pressure condensable water vapor bubble is generated between the two separated transverse surfaces of the two sections. This bubble then implodes to create a singular seismic pulse.

In an alternate embodiment of this invention, two hollow tubular body sections are submerged in axially aligned end-to-end relation, each such tubular member being provided with a similar sealed cylindrical bore. A pair of pistons are mounted at the respective extremities of a rod extending axially between the two bodies and within the two cylindrical bores. Air springs are applied behind both pistons effective to bias said pistons within their respective cylindrical bores such that the two tubular members are drawn together to establish an interface between respective transverse external surfaces thereof. Ignition of an explosive gas mixture in front of each piston approximately simultaneously drives the two body sections in opposite directions to separate the transverse external surfaces so as to generate an implodable water vapor bubble therebetween.

The invention also comprises a method of imparting a seismic pulse to a submarine earth surface comprising generally the steps of urging together two bodies submerged in the water and linked together so that an interface is established between two respective external surfaces thereof of similar contour and driving said bodies explosively in opposite directions substantially normal to said interface to separate said surfaces by a predetermined distance, thereby generating an implodable bubble of low pressure condensable gas vapor between said surfaces.

DETAILED DESCRIPTION

Figure 1:
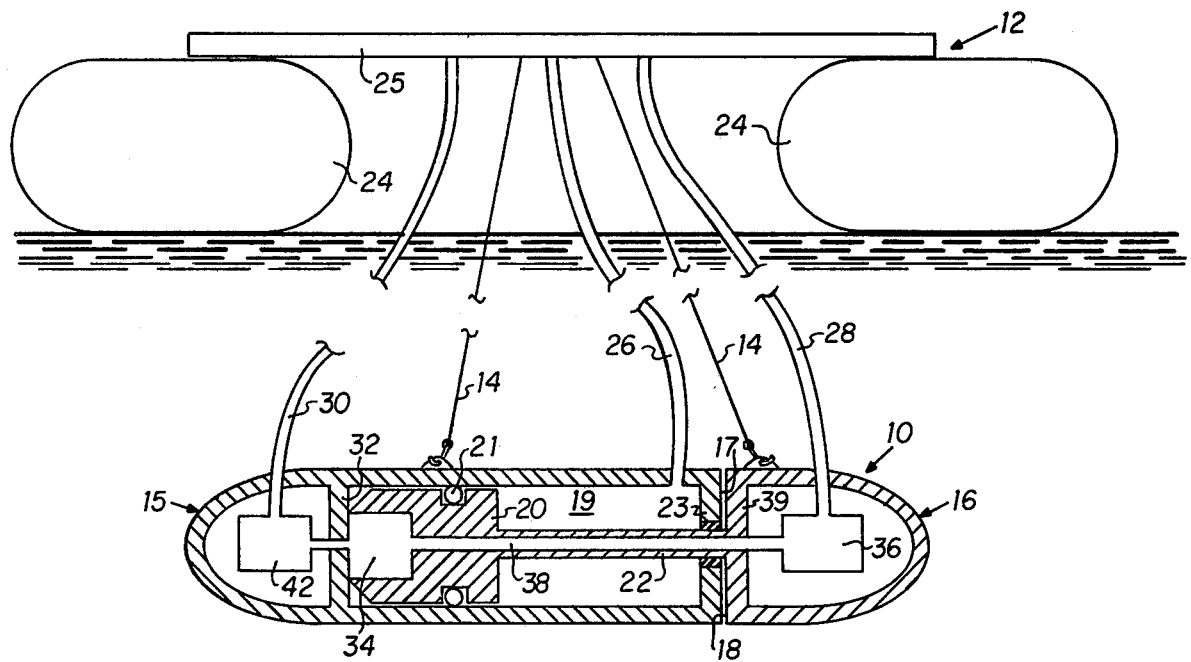
FIG. 1 is a longitudinal sectional view of an apparatus in accordance with the preferred embodiment of this invention preliminary to firing.

In accordance with a preferred embodiment of this invention, a hydrodynamically streamlined seismic gun 10 as seen in FIG. 1 is supported from a floating vessel 12 beneath the surface of the water at a predetermined depth by means of a pair of flexible cables 14. The gun 10, preferably of elongated hollow tubular shape, consists generally of an aft main body section 15 and a forward nose section 16 interfitted therewith in end-to-end relation. External contact between the body section 15 and the nose section 16 is effected at the interface between the transverse surfaces 17 and 18, which are separable by relative longitudinal movement between the two sections.

The body section 15 is provided with a cylindrical bore 19 extending over a part of its length. A piston 20 provided with "O" ring or other suitable peripheral seal means 21 and slidable within the bore 19 is interconnected with the nose section 16 at the surface 18 by means of a connecting rod 22. The rod 22 extends axially along the bore 19 and slidably penetrates an end wall 23 of the body 15 which includes the external surface 17. Suitable sleeve means make this slidable junction substantially hermetic.

The floating vessel 12 may conveniently consist of a pair of parallel pontoons 24 between which an equipment carrying platform 25 may be supported. Appropriate electrical connections and gas lines to be described may be brought to the gun 10 from the platform 25 by means of downwardly extending flexible umbilical links 26, 28 and 30, all of which are conventional and as such form no part of this invention. It should be understood, however, that there are substantially no external constraints on the relative longitudinal movement of the sections 15 and 16 other than the resistance of the water.

Preparatory to firing of the gun 10, the volume between the piston 20 and the end wall 23 is pressurized with air introduced through the umbilical 26 at a suitable low pressure, for example, about ten pounds per square inch gauge pressure. In consequence, the piston 20 is urged away from the end wall 23 and toward the opposite end wall 32, carrying the nose section 16 with it until the surfaces 17 and 18 are in contiguous contact. The bore 19 is of a length such that in this prefiring position, the piston 20 makes contact with the wall 32. The face of the piston 20 may be provided with a cavity or depression 34 of a depth and contour sufficient to create in conjunction with the end wall 32 an explosion chamber of selected volume.

In accordance with techniques well-known to the art of seismic exploders, separate gas lines carrying explosive gaseous fuel such as propane and oxygen may be introduced into a central cavity in the nose section 16 through the unbilical 28 and there fed into a combination gas mixture and spark control unit 36. A longitudinal gas conduit 38, suitably interconnected with the supply of mixed gases, may be drilled through the aft wall 39 of the nose section 16, through the connecting rod 22 and through the piston 20 to the face thereof. This channel 38 enables introduction into the explosion chamber formed by the volume in front of the piston 20 of an explosive mixture of propane and oxygen in desired proportions. The pressure of this explosive mixture is maintained at a value below that of the air cushion existing behind the piston 20 in order to insure positive initial seating of the surfaces 17 and 18 which also insures that the volume of pressurized explosive mixture remains constant.

In operation, the explosive gas mixture formed in control unit 36 is ignited by a suitable electrical signal delivered from the float 12 and initiates a firing train along the conduit 38. When the burning gases reach the face of the piston 20, an explosion occurs within the adjacent chamber within the cylindrical bore 19 which reaches a pressure peak in a very short period of time, on the order of milliseconds. The force of this explosion drives the piston 20 towards the wall 23, compressing the intermediate air cushion. By suitable valve means (not shown) the air behind the piston 20 may be exhausted to the surface through the umbilical 26 to lessen the resistance to the travel of the piston 20. At the same time an equal and opposite force against the wall 32 urges the main body section 15 in the opposite direction. The result is that sections 15 and 16 separate rapidly at the interface between the transverse surfaces 17 and 18. The speed of this separation is aided by providing the extremities of the sections 15 and 16 with a hydrodynamically streamlined shape such as shown in FIG. 1. The travel of the piston 20 is controlled by various factors such as the quantity of explosive gas mixture, the frictional forces present, and the reaction due to pressure buildup within the air spring. In any event, sufficient damping is provided to prevent piston 20 from contacting the end wall 23.

Figure 2:
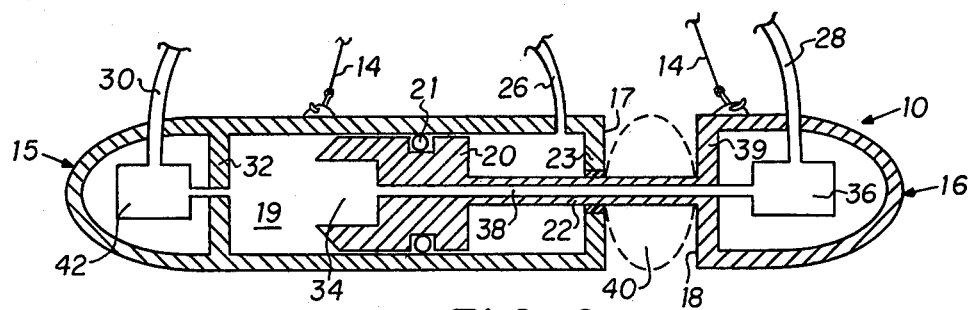
FIG. 2 is a longitudinal sectional view of the apparatus of FIG. 1 shown after firing thereof.

A low pressure bubble 40 of condensable water vapor as best seen in FIG. 2 and shown in dotted outline now forms in the space between the surfaces 17 and 18, having a growth pattern determined by the speed of separation and whose ultimate size is directly related to the cross-sectional surface area of surfaces 17 and 18 and to the distance of travel of the sections 15 and 16 relative to each other.

After approximately 30 to 100 milliseconds, the bubble 40 implodes or collapses responsive to the surrounding hydrostatic pressure to create a seismic pulse at the conclusion of such implosion. Although shown for simplicity as spheroidal, it is theorized that the bubble 40 is probably depressed in the middle into an hour glass shape because implosion has begun there while the remainder of the bubble is still forming. This pulse has an energy content and peak value substantially independent of the depth of seismic gun 10 below the surface of the water. Typically, peak pressures on the order of $10^4$ atmospheres may be expected. Since there is little resistance to the initial separating motion of the sections 15 and 16, the initial positive pulse due to the chemical explosion will have no appreciable effect upon the total pressure spectrum.

After a suitable time interval, the gun 10 may be prepared for the next firing by repressurizing the air cushion from the surface as previously described and by introducing a fresh explosive gas mixture in the chamber in front of the piston 20. Exhaust gases may be scavenged by the replenished supply of explosive mixture and expelled to the surface through the umbilical 30. This may be accomplished, for example, by suitable valve means (not shown) within a control unit 42 operated electrically from the surface.

It should be appreciated that except for the internal friction of the piston 20 and the rod 22 together with the resistance of the water itself no external constraints exist upon the relative longitudinal movement of the sections 15 and 16. In consequence, the energy of the chemical explosion of the gas mixture, which may exert a pressure on the order of 1000 psi in two opposite directions, is very efficiently converted into the mechanical force necessary to achieve the final bubble implosion. It should be understood that within the scope of this invention it is not necessary that the gun 10 be supported above the sea bed or submarine earth surface in order to operate properly. The only requirement is that suitable surface connections be maintained such as through the umbilicals 26, 28, and 30 as above described. However, the presence of air filled voids within the interior of sections 15 and 16 may provide the gun 10 with a degree of buoyancy such that these umbilicals do not substantially constrain its longitudinal motion.

The shape of the face of the piston 20 is not critical as long as a suitable explosive space or chamber is created when the piston 20 contacts the end of the cylindrical bore 19 in the section 15. As shown in FIG. 1, this may be accomplished by giving the face of the piston 20 a cone shape with a central depression, but this is by no means essential. The important point is that the explosive gas mixture will be confined in a region within the bore 19 separated from the remainder of the bore 19 by the "0" ring seal 21. The seal 21 may also be a metal piston ring if so desired.

It is important to realize that the cavitation bubble 40 in this invention is initially formed at a low pressure in what is substantially an evacuated environment produced instantaneously as the surfaces 17 and 18 separate from each other. The pressure within the bubble 40 will be that of the vapor pressure of water at the temperature existent at the depth of the gun 10. For example, at approximately 20° centigrade, a vapor pressure of 1.75 centimeters of mercury exists. As a consequence of the low pressure of the cavitation bubble 40, implosion will occur as soon as it is formed and a sharp positive singular pressure spike may be expected. Applicant believes that an important advantage may be achieved thereby over devices which are adapted to create a cavitation bubble by steam injection. In the latter technique the bubble itself will be initially at a high pressure which will drop only with the condensation of the steam which forms it. Implosion will take place only after the vapor pressure in the bubble drops below that of the hydrostatic fluid pressure which surrounds it. It is known that the resulting pressure pulse in that case will occur with a relatively large time delay preceded by a substantial positive precursor.

A further important aspect of the invention is that the gun 10 need not assume any particular orientation with respect to the submarine earth surface. For example, if so desired it may be suspended in a vertical position (not shown) by means of a cable offering no resistance to an upwardly directed force. However, the shallow water exploration will most conveniently assume a horizontal position.

Figure 3:
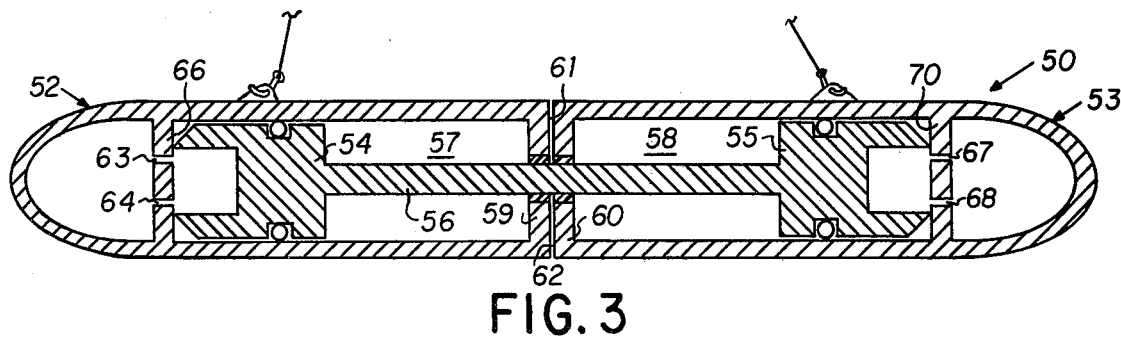
FIG. 3 is the longitudinal sectional view of an apparatus in accordance with an alternate embodiment of this invention.

An alternate embodiment of this invention is set out in FIG. 3 illustrating a seismic gun 50 consisting of two similar, axially aligned body sections 52 and 53 positioned end-to-end so that their streamlined extremities face away from each other. The surface support connections, umbilical links, and internal control units for the gun 50 have been omitted from the showing of FIG. 3 since their construction and function is in all respects entirely similar to that of similar elements described above in connection with FIGS. 1 and 2. The body sections 52 and 53 are interconnected by means of a pair of pistons 54 and 55 mounted at the respective extremities of a rod 56. Pistons 54 and 55 are slidable relative to sealed cylindrical bores 57 and 58 respectively in body sections 52 and 53. The connecting rod 56 penetrates the adjacent end walls 59 and 60 of the sections 52 and 53, which are provided respectively with facing transverse surfaces 61 and 62. Suitable seals are provided to insure that these intereconnections are water tight.

In the manner previously described, the space within the bores 57 and 58 behind the pistons 54 and 55 respectively may be pressurized from the surface with air so as to effectively urge the sections 52 and 53 together to form an interface between surfaces 61 and 62. Explosive gas mixtures are thereafter introduced within the bores 57 and 58 in the spaces in front of the pistons 54 and 55 respectively. In this alternate embodiment, the firing chambers may each communicate with separate gas intake and exhaust line such as lines 63 and 64 extending through end wall 66 and lines 67 and 68 extending through end wall 70 into appropriate control units housed within the respective extremities of sections 52 and 53. This will enable introduction of explosive gases and scavenging of exhaust byproducts within the same umbilical suitably interconnected with these control units.

The operation of the gun 50 is similar to that of the preferred embodiment of FIG. 1. Upon substantial simultaneous ignition of the explosive gas mixture in front of pistons 54 and 55, the explosive forces will seek to expand their respective explosive chamber and in so doing will urge the sections 52 and 53 in opposite directions to separate the surfaces 61 and 62. As previously described, a condensable vapor bubble forms at the interface between these surfaces 61 and 62 and again implodes to produce a seismic pulse.

Although the invention has been described with a certain degree of particularly, it is understood that the present disclosure has been made only by way of example and that numerous changes in the details of construction and the combination and arrangement of parts may be resorted to without departing from the spirit and the scope of the invention as hereinafter claimed.

What is claimed is:

1. Apparatus for imparting a seismic pulse to a submarine surface of the earth comprising:
   a. a first and a second enclosed tubular member supported beneath the surface of a body of water in axially aligned adjacent end-to-end relation, each of said first and second tubular members having a sealed cylindrical bore therein;

b. a pair of pistons slidably movable within said cylindrical bores respectively;
c. a rod extending axially between said first and second tubular members and within said cylindrical bores to interconnect said pair of pistons;
d. air spring means behind said pistons within said cylindrical bores adapted to urge said pistons relative to said cylindrical bores so as to bias said first and second tubular members together; and
e. explosive gas means within said cylindrical bores in front of said pistons adapted to urge said first and second tubular member apart in opposition to said air spring means so as to rapidly separate the facing ends of said first and second tubular members and create a low pressure condensable vapor bubble therebetween in said body of water.

2. A method of imparting a seismic pulse to a submarine earth surface comprising the steps of:
a. urging together in end-to-end relation two slidably interconnected tubular members submerged in a body of water so that an interface is established between two respective transverse facing surfaces thererof, each of said tubular members being provided respectively with a sealed cylindrical bore, a pair of pistons being mounted at the respective extremities of a rod extending axially between said cylindrical bores and adapted to move slidably within said respective bores, said step of urging said tubular members together comprising introducing air spring means behind each of said pistons within said respective cylindrical bores; and
b. thereafter forcing said members explosively apart by igniting an explosive gas mixture in front of each of said pistons approximately simultaneously to rapidly separate said facing surfaces by a predetermined distance, thereby creating a cavitation bubble of condensable gas vapor in said body of water between said facing surfaces adapted to implode to yield said seismic pulse.

* * * * *